United States Patent [19]

Maemura

[11] Patent Number: 5,394,462
[45] Date of Patent: Feb. 28, 1995

[54] COMMUNICATION APPARATUS HAVING A REDIAL FUNCTION AND A SIMPLIFIED-DIAL-NUMBER REGISTRATION FUNCTION

[75] Inventor: Koichiro Maemura, Isehara, Japan

[73] Assignee: Ricoh Company, Ltd., Tokyo, Japan

[21] Appl. No.: 12,755

[22] Filed: Feb. 3, 1993

[30] Foreign Application Priority Data

Feb. 5, 1992 [JP] Japan .................. 4-019601

[51] Int. Cl.⁶ .............. H04M 15/00; H04M 1/56; H04M 3/42; H04M 1/00
[52] U.S. Cl. .................. 379/142; 379/127; 379/216; 379/354; 379/355; 379/356
[58] Field of Search ............ 379/127, 142, 216, 354, 379/356, 358

[56] References Cited

U.S. PATENT DOCUMENTS

| | | | |
|---|---|---|---|
| 4,672,660 | 6/1987 | Curtin | 379/142 |
| 4,682,357 | 7/1987 | Irino | 379/356 |
| 4,817,133 | 3/1989 | Takahashi et al. | 379/355 |
| 4,860,349 | 8/1989 | Brown | 379/356 |
| 4,894,861 | 1/1990 | Fujioka | 379/217 |
| 4,924,496 | 5/1990 | Figa et al. | 379/142 |
| 4,930,155 | 5/1990 | Kurokawa | 379/355 |
| 4,933,968 | 6/1990 | Iggulden | 379/359 |
| 4,980,910 | 12/1990 | Oba et al. | 379/355 |
| 5,095,503 | 3/1992 | Kowalski | 379/354 |
| 5,151,933 | 9/1992 | Abe | 379/355 |
| 5,189,696 | 2/1993 | Yoshida | 379/356 |

FOREIGN PATENT DOCUMENTS

4-70258  3/1992  Japan .

Primary Examiner—Stephen Chin
Assistant Examiner—Vijay Shankar
Attorney, Agent, or Firm—Oblon, Spivak, McClelland, Maier & Neustadt

[57] ABSTRACT

A communication apparatus, performing a communication with a remote terminal by establishing a communication channel by calling the dial-number of the terminal, in which a dial-number stored in a redial memory can be directly transferred to a registration memory. The communication apparatus comprises a redialing unit for dialing a previously dialed dial-number stored in a redial memory, and a dialing unit for dialing a registered dial-number, stored in a registration memory, by operating a predetermined key. The communication apparatus further comprises a registration unit for performing registration of a dial-number to be used by the dialing unit by directly transferring the dial-number from the redial memory to the registration memory.

11 Claims, 11 Drawing Sheets

| INDENTFICATION CODE | DIAL-NUMBER | DATA FOR DISPLAY (CSI/PTI) | DATA FOR SIMPLIFIED PROTOCOL (DIS/NSF) |
|---|---|---|---|
| #1 | xx-xxx-xxxx | xxxxxxxx | xxxxxxxx |
| #2 | xx-xxx-xxxx | xxxxxxxx | xxxxxxxx |
| #10 | xx-xxx-xxxx | xxxxxxxx | xxxxxxxx |

| ORDER | IDENTIFICATION CODE |
|-------|---------------------|
| 1     | (#5)                |
| 2     | (#1)                |
| 10    | (#3)                |

COMMUNICATION APPARATUS HAVING A REDIAL FUNCTION AND A SIMPLIFIED-DIAL-NUMBER REGISTRATION FUNCTION

BACKGROUND OF THE INVENTION

The present invention generally relates to a communication apparatus such as a telephone or a facsimile apparatus, and more particularly to a communication apparatus having a redial function and a simplified-dial-number registration function; the redial function is a function by which a past dialed number can be dialed again by a simple key-operation, and the simplified-dial-number registration function is a function by which a desired dial number can be registered so as to dial the desired number by only pressing a single key or a few keys.

Many conventional telephone and facsimile apparatuses have a redial function by which the last dialed number is dialed again by pressing a redial key. Additionally, many conventional telephones and facsimile apparatuses have a function by which a desired number is registered in a memory provided in the apparatus and the desired number can be dialed by pressing a single key or by inputting a simplified number by pressing a few keys. In order to register a desired dial-number in the apparatus, the desired dial-number must be manually input to the apparatus by a user or a maintenance service person. This dial number registration is a time and labor consuming operation.

Generally, a facsimile apparatus receives information concerning a designation and a communication capability of the called facsimile apparatus through a given communication control procedure. Then the designation of the connected apparatus is displayed on the display of the calling facsimile apparatus, and the calling facsimile apparatus sends appropriate image signals to the called facsimile apparatus in accordance with the communication capability.

There is a conventional facsimile apparatus in which dial-numbers are registered together with information of the designation and the communication capability of the apparatus corresponding to each dial-number. This type of facsimile apparatus sends image signals immediately after the connection with the called apparatus is complete by using a registered number. Namely, the communication control procedure for checking the communication capability is omitted. This communication procedure is called as a shortened protocol.

Conventionally, the above mentioned redial function and simplified-dial-number registration function are independently provided with no interrelationship. Accordingly, despite the fact that dial-numbers input through the both functions are stored in a memory provided in the same apparatus, the dial-number registered for the redial function is not able to be used as a registered dial-number for the simplified-dial-number registration function.

A communication apparatus, for example, suggested in the Japanese Laid-Open Patent Application No.4-70258 automatically registers every dialed number whenever there is an empty area in the memory used by the simplified-dial-number registration function. This automatic registration function has an advantage in that the time and labor for the inputting operation of the simplified-dial-number registration function can be omitted. However, by this automatic registration function, any dial numbers are registered whether or not the user desires to register the dial-number. Additionally, no description is made in the above mentioned Patent Application with respect to the condition where there is no empty area in the memory. Further, there is a possibility to perform a duplicate registration for the same dial-number, and thus the memory used in the simplified-dial-number registration function may not be effectively used.

SUMMARY OF THE INVENTION

It is a general object of the present invention to provide an improved and useful communication apparatus in which the above mentioned disadvantages are eliminated.

A more specific object of the present invention is to provide a communication apparatus in which a dial-number can be directly transferred from a memory used in a redial function to a memory used in a simplified-dial-number registration function.

In order to achieve the above mentioned objects, the communication apparatus, performing a communication with a remote terminal by establishing a communication channel by calling the dial-number of the terminal, according to the present invention comprises:

a redialing unit for dialing a previously dialed dial-number by operating a redial key, the dial-number having been stored in a redial memory;

a registered dial-number dialing unit for dialing a registered dial-number by operating a predetermined key, the registered dial-number having been stored in a registration memory; and a registration unit for registering a dial-number to be used by the registered dial-number dialing unit by directly transferring the dial-number from said redial memory to said registration memory.

According to the present invention, the dial-number stored in the redial memory can be directly input to the registration memory used in the registration function by the provision of the registration unit. Thus a dial-number inputting operation for the registration function is eliminated; resulting in reduction of time and labor. Further, there is no possibility to register a wrong dial-number by mistake because the dial-number to be registered has been dialed once before and confirmed by means of the past communication.

Other objects, features, and advantages of the present invention will become more apparent from the following detailed description when read in conjunction with the accompanying drawings.

DETAILED DESCRIPTION OF THE PREFERRED EMBODIMENTS

Figure 1:
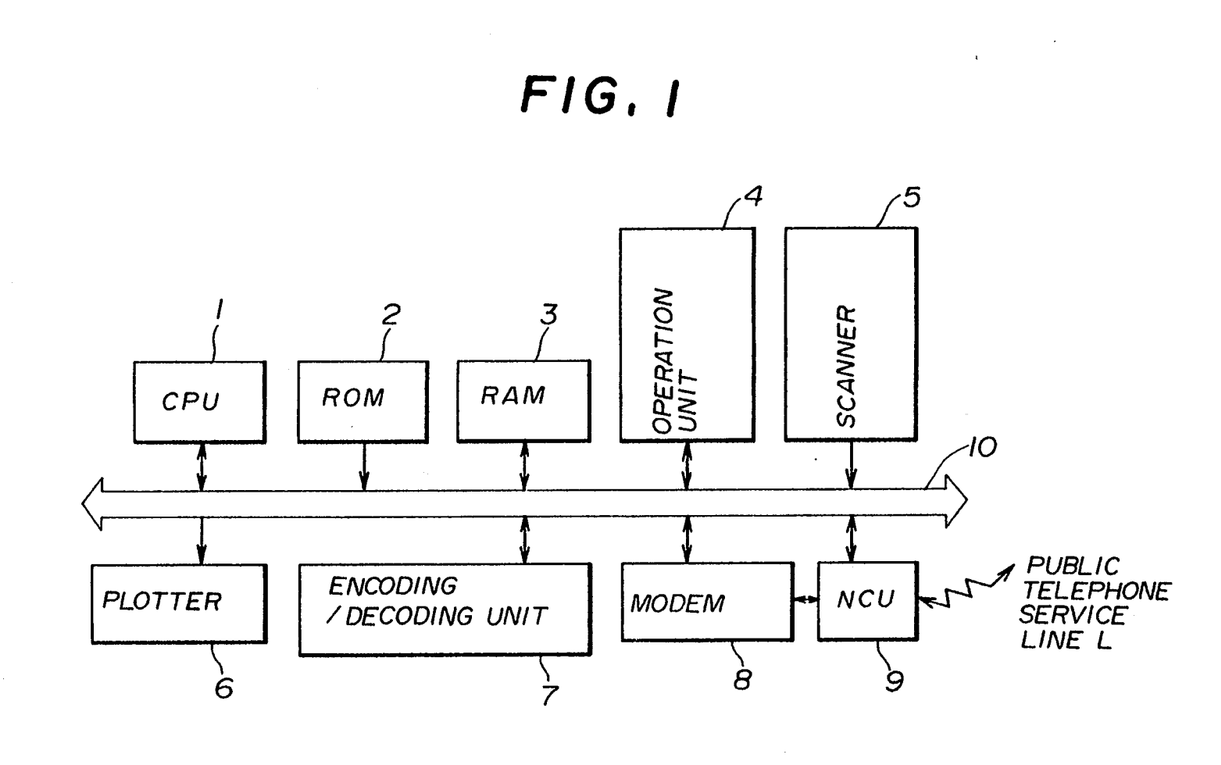
FIG. 1 is a block diagram of an embodiment of a facsimile apparatus according to the present invention.

A description will be given, with reference to FIG. 1, of a structure of an embodiment of a facsimile apparatus according to the present invention. FIG. 1 is a block diagram of the embodiment of a facsimile apparatus according to the present invention.

A CPU (Central Processing Unit) 1 controls each portion of the facsimile apparatus described below. Particularly in this embodiment, means for performing registration of dial-numbers and means for editing identification information corresponding to each of the dial-numbers are realized by the CPU 1.

A ROM (Read Only Memory) 2 stores a program for a procedure of an operation of the facsimile apparatus of this embodiment. A RAM (Random Access Memory) 3 is used as a redial memory for a redial function and as a registration memory for a simplified-dial-number registration function. The redial memory stores a calling dial-number and identification information (NSF/CSI) for the called terminal (facsimile apparatus).

An operation unit 4 is provided for displaying operation conditions of the apparatus and for inputting instructions by an operator. A scanner 5 scans and reads images on a material to be sent. A plotter 6 records images on a recording paper.

An encoding/decoding unit 7 performs encoding and data compression on the image information signal to be sent, and performs decoding operation and decompression on the image information signal received from a remote facsimile apparatus. A modem 8 temporarily stores image information data being sent or that has been received. An NCU (Network Control Unit) 9 is connected to the public telephone service line L, and performs a predetermined network control operation when communication with the remote facsimile apparatus starts.

The above mentioned units are interconnected with each other via a system bus 10 so as to exchange data and various control signals.

Figure 2:
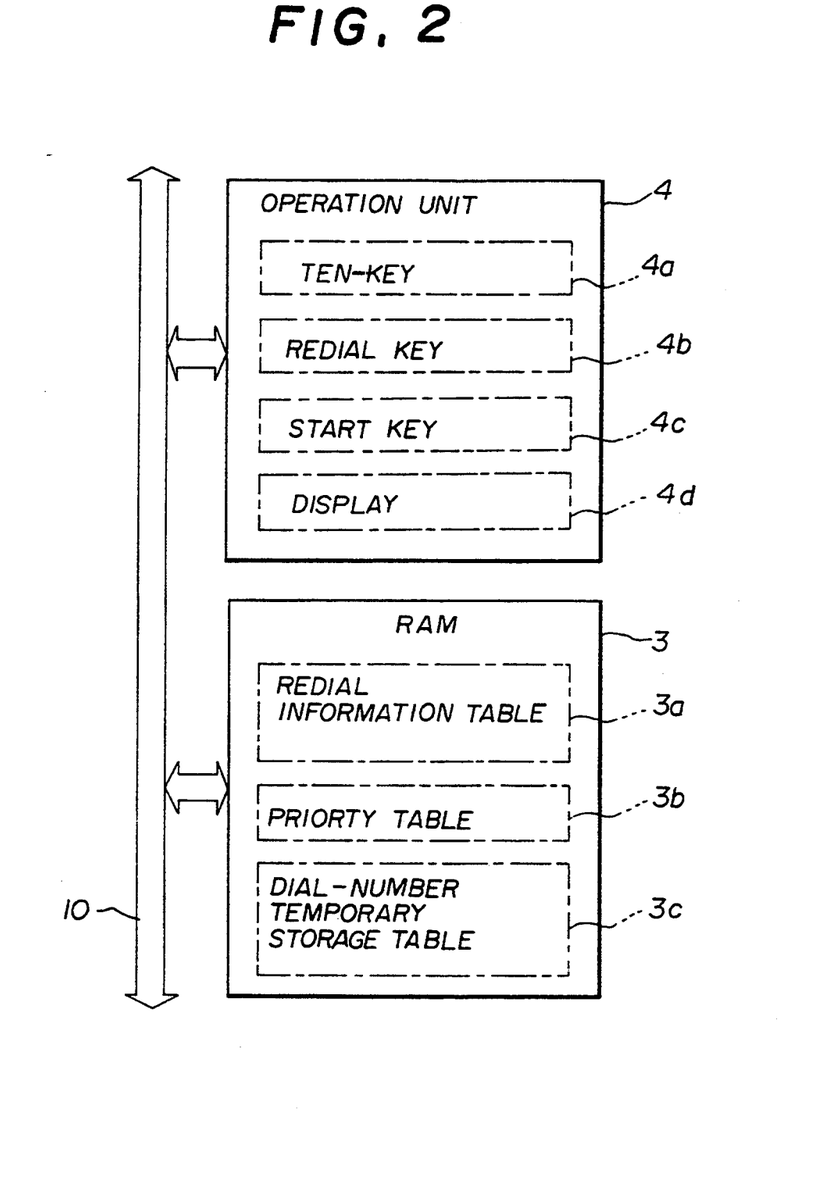
FIG. 2 is a block diagram showing a detail of a RAM and an operation unit shown in FIG. 1.

FIG. 2 is a block diagram showing details of the RAM 3 and the operation unit 4 shown in FIG. 1. The operation unit 4 comprises a ten-key keypad 4a, a redial key 4b, a start key 4c, and a display 4d. The ten key 4a is used for inputting a dial-number. The redial key 4b is used for performing a redial function. The start key 4c is used for starting a communication operation.

Figure 3:
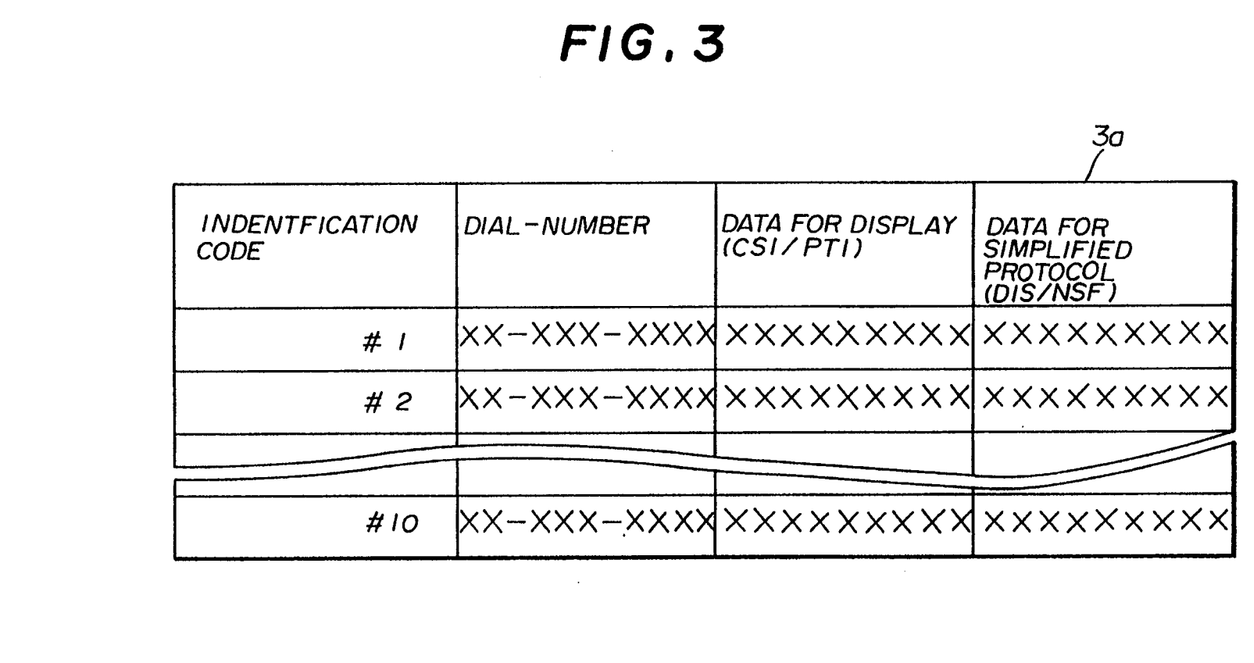
FIG. 3 is an illustration for explaining a redial information table.

The RAM 3 comprises a redial information table 3a, a priority table 3b, and a dial-number temporary storage table 3c. The redial information table 3a, as shown in FIG. 3, stores dial-numbers, data for display (identification information) and data for simplified protocol function together with identification codes #1 to #10. The data for display is a called dial-number received as a CSI (Called Subscriber Identification) signal or an RTI (Remote Terminal Identification) information received as an NSF (Non-Standard Facilities) signal in a transmission control procedure. The above mentioned RTI signal is generally a designation of the facsimile terminal. The data for simplified protocol function is information for representing the capability of a remote terminal such as information on width of recording paper, recording line density, maximum data-transmission speed and a data-transmission speed which has been employed.

Figure 4:
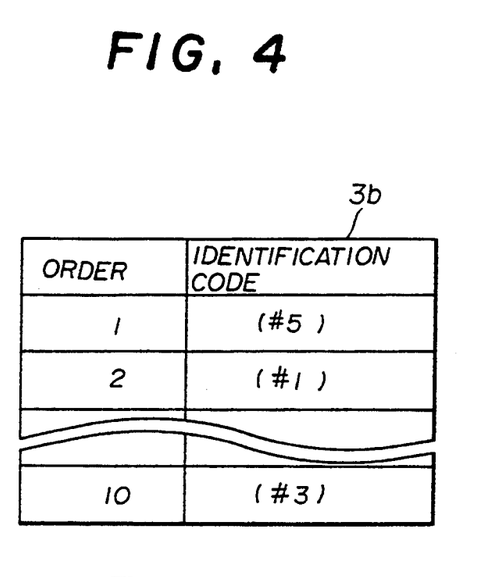
FIG. 4 is an illustration for explaining a priority table.

The priority table 3b, as shown in FIG. 4, is provided for giving a priority number to the identification codes #1 to #10. This priority number is used in a redial operation when reading out a dial-number or various data stored in the RAM 3.

Figure 5:
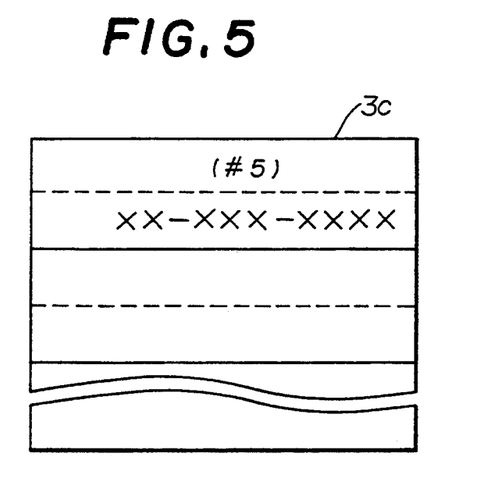
FIG. 5 is an illustration for explaining a dial-number temporary storage table.

The dial-number temporary storage table 3c, as shown in FIG. 5, temporarily stores a dial-number, selected by means of redial operation, together with corresponding identification information.

Figure 6:
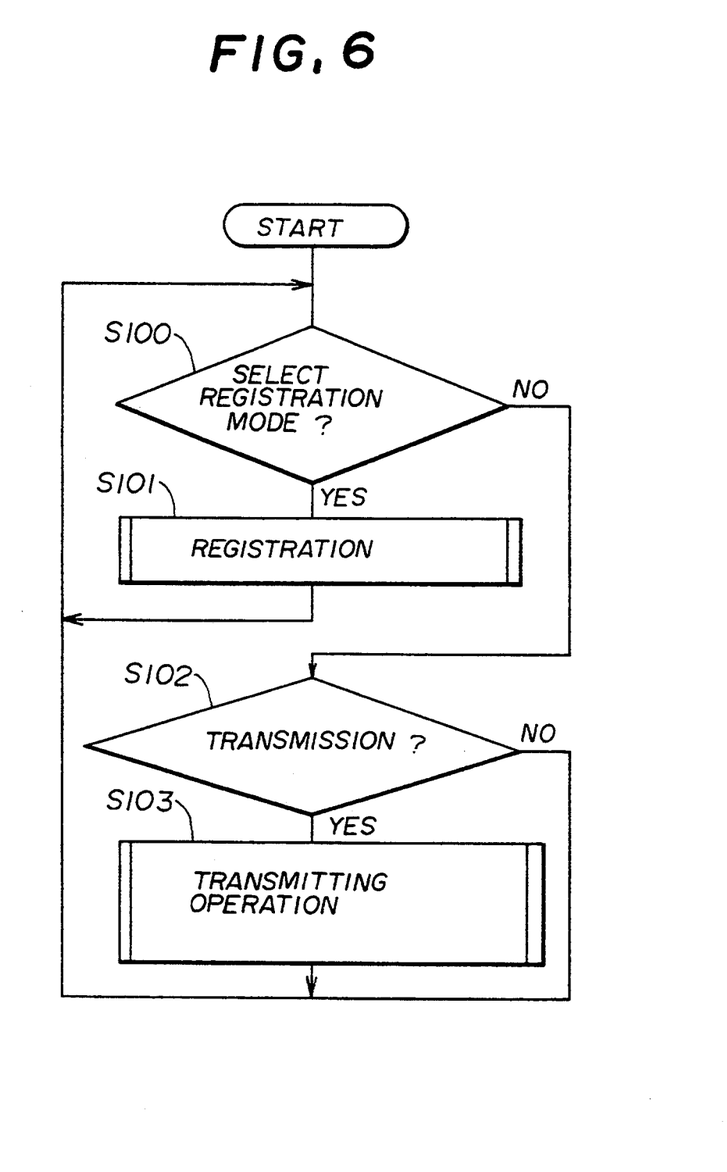
FIG. 6 is a flow chart for explaining an operation routine of the embodiment of a facsimile apparatus according to the present invention.

A description will now be given, with reference to FIGS. 6 to 8, of an operation of the above mentioned embodiment. FIG. 6 is a flow chart for explaining an operation routine of the embodiment of a facsimile apparatus according to the present invention.

When the routine shown in FIG. 6 starts, it is judged, in step S100 (hereinafter "step" is omitted), whether or not a registration mode, in which the desired dial number and identification information are stored in the RAM 3, is selected. This is performed, for example, by checking whether or not a key for selecting the registration mode on the operation unit 4 is pressed. When it is judged that the key is pressed, the routine proceeds to S101 where the registration operation is performed.

When it is judged in S100 that the registration mode is not selected, the routine proceeds to S102 where it is judged whether or not the operator is operating the facsimile apparatus for a facsimile transmission. This is performed by checking whether or not a sending material has been placed on the facsimile apparatus and the start key has been pressed. When the operator selects a facsimile transmission, the routine proceeds to S103 to perform the transmitting operation. When the operator does not select a facsimile transmission, the routine returns to S100.

Figure 7A:
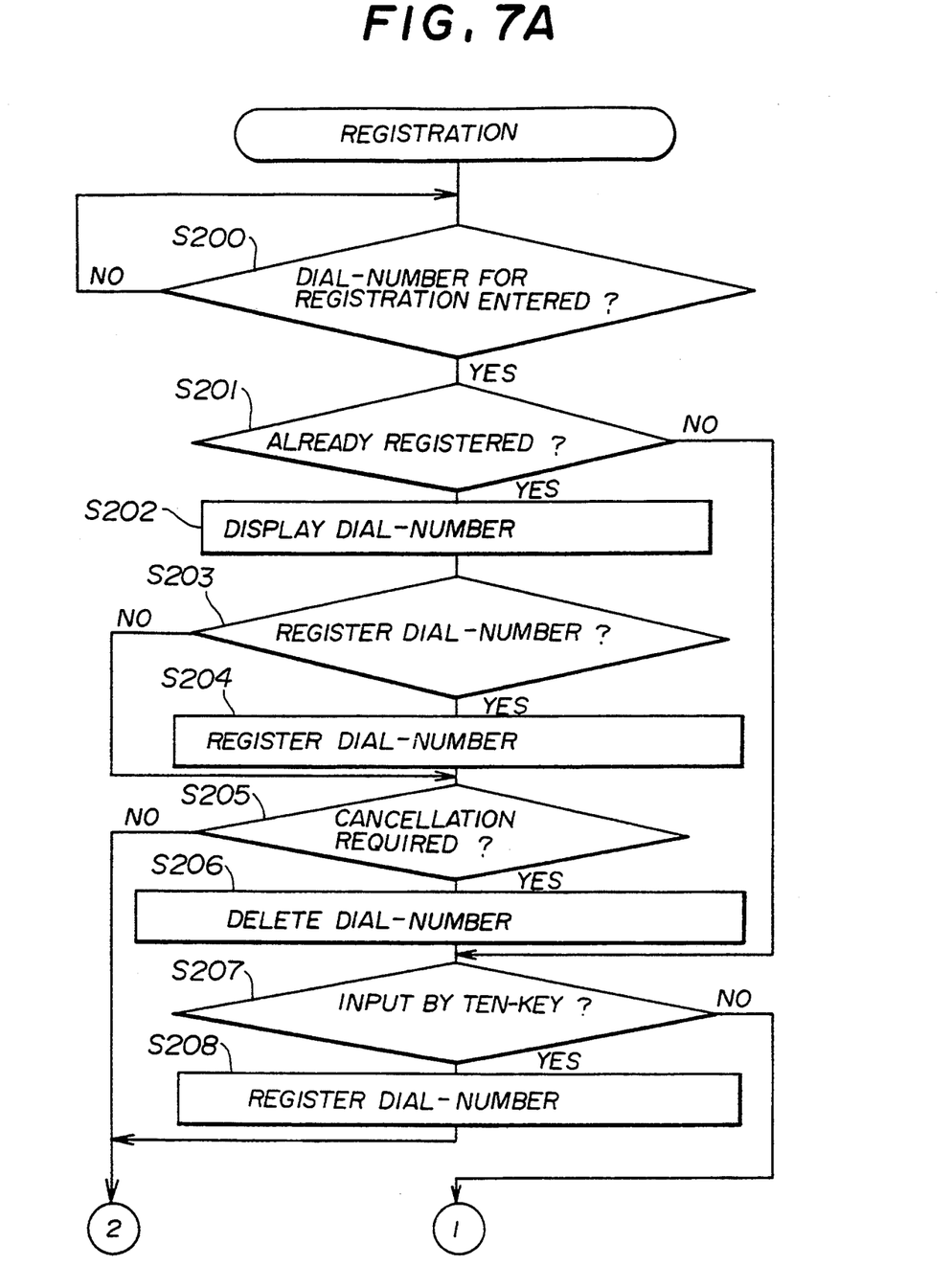
FIGS. 7A and 7B are flow charts for 10 explaining the detail of the registration operation shown in FIG. 6.
Figure 7B:
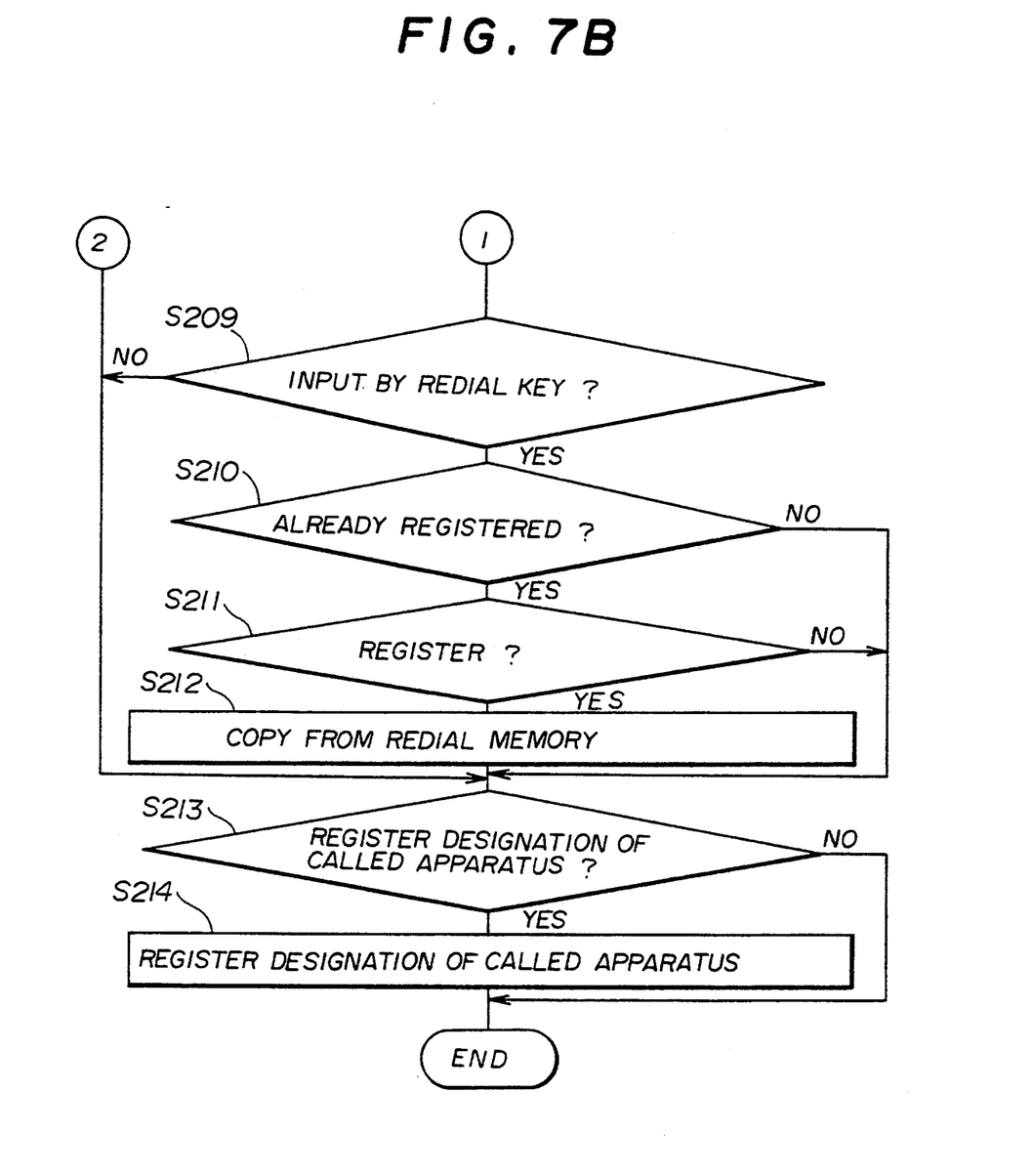

FIGS. 7A and 7B are flow charts for explaining the detail of the registration operation shown in FIG. 6. As shown in FIG. 7A, in S200, it is judged whether or not a dial-number is being registered for a function by which the desired dial-number is dialed by means of a single-key operation (hereinafter called single-key function) or for a function by which the desired dial-number is dialed by means of a simplified key-operation (hereinafter called simplified-key function). When there is a dial-number input, it is checked, in S201, whether or not the dial-number has been registered in the past. If the dial-number has been registered in the past, the dial-number is displayed, in S202, on the display 4d of the operation unit 4 together with information for notifying the operator that the dial-number has been already registered. Then the routine proceeds to S203 where it is judged whether or not the operator desires to edit the displayed dial-number. When the operator desires to edit the dial-number, the editing operation is performed, in S204, by means of the CPU 1. After that, the routine proceeds to S205 where the operator is asked if cancellation of the registered dial-number is required. When a cancellation key is pressed by the operator, the dial-number is deleted, in S206, from the registration memory in the RAM 3. When it is judged, in S203, that the operator does not desire to edit the dial-number, the routine directly proceeds to the above mentioned step S205.

In a case where there is no registered dial-number in the memory which is the same as the dial-number input in S201, or the dial-number is deleted in S206, the routine proceeds to S207 and waits for the next input of a dial-number entered through the ten-key 4a of the operation unit 4. When a new dial-number is input, the new dial-number is registered, in S208, for the specified registration function.

When a signal from the redial key 4b is input in S209, the dial-number stored in the redial memory is compared, in S210, with each of the dial-numbers stored in the registration memory by means of the CPU 1 so as to check if the identical number exists.

If the identical number already exists in the registration memory, the routine proceeds to S211 where the operator is asked whether or not the dial-number should be registered even if duplicate registration is performed. If the operator wishes to register the dial-number in S211, the dial-number stored in the redial memory is transferred, in S212, to a dial-number storing area of the registration memory for the single-key function or the simplified-key function.

Additionally, if NSF (CSI) data which is the identification information for the called facsimile apparatus is stored, similarly to the above, the information is transferred to a designation storing area of the registration memory.

In the case where the operator does not wish to register the duplicate number, the transfer of the dial-number from the redial memory to the registration memory is not performed.

Next, in S213, when the operator desires to register and edit the designation of the called facsimile apparatus, the registration and editing is performed in S214. That is, if NSF (CSI) data has been copied from the redial memory to the registration memory, the editing of the NSF data is performed.

Figure 8:
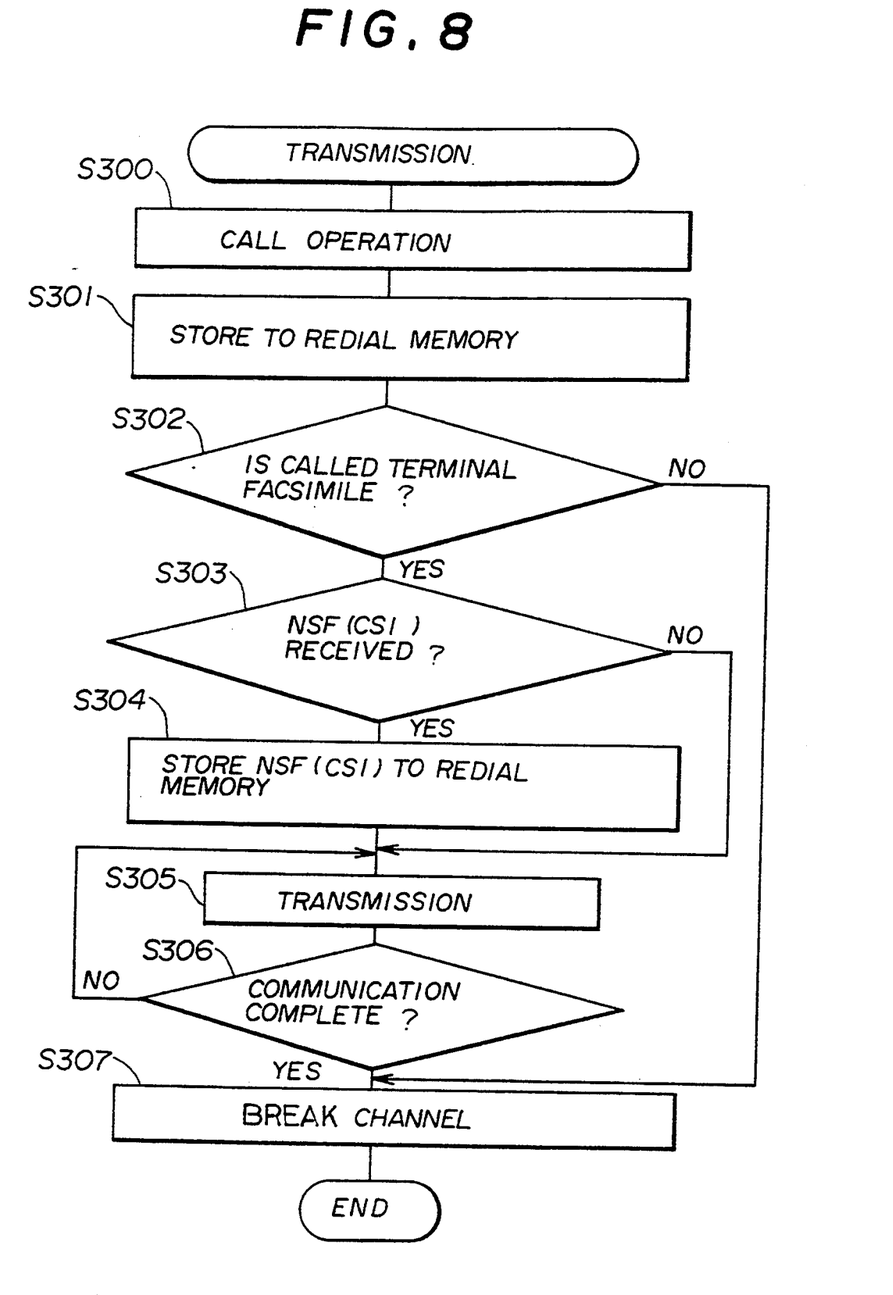
FIG. 8 is a flow chart for explaining the detail of the transmitting operation shown in FIG. 6.

FIG. 8 is a flow chart for explaining the details of the transmitting operation shown in FIG. 6. First, in S300, the entered dial number is called, and in S301, the called dial number is stored in the redial memory.

When the called terminal is a facsimile apparatus, it is judged, in S303, whether or not NSF (CSI) data has been received. If NSF (CSI) data has been received, the NSF data is stored, in S304, in the redial memory. When NSF (CSI) data has not been received, the transmitting operation is performed, in S305, without any changes. When it is judged, in S306, that the communication is complete, or it is judged, in S302, that the called terminal is not a facsimile apparatus, the routine proceeds to S307 where the communication channel is cut off, and the routine ends.

Next, a description will be given of a case where a plurality of dial-numbers can be stored in the redial memory as shown in FIG. 2. The assumption is made that the facsimile apparatus has already called more than 10 different terminals. In this case, the last 10 dial-numbers, data for display and data for the simplified protocol are stored in the redial information table 3a corresponding to the identification codes #1 to #10.

When a transmitting operation is performed, the operator chooses between a regular dial-number entering transmission function and the redial transmission function. If the dial-number being called is included in the last 10 called dial-numbers, the operator can choose the redial transmission function.

If the operator has chosen the regular transmission function, the transmitting operation starts when the start key 4c is pressed after a dial-number has been entered by means of the ten key 4a.

Figure 9A:
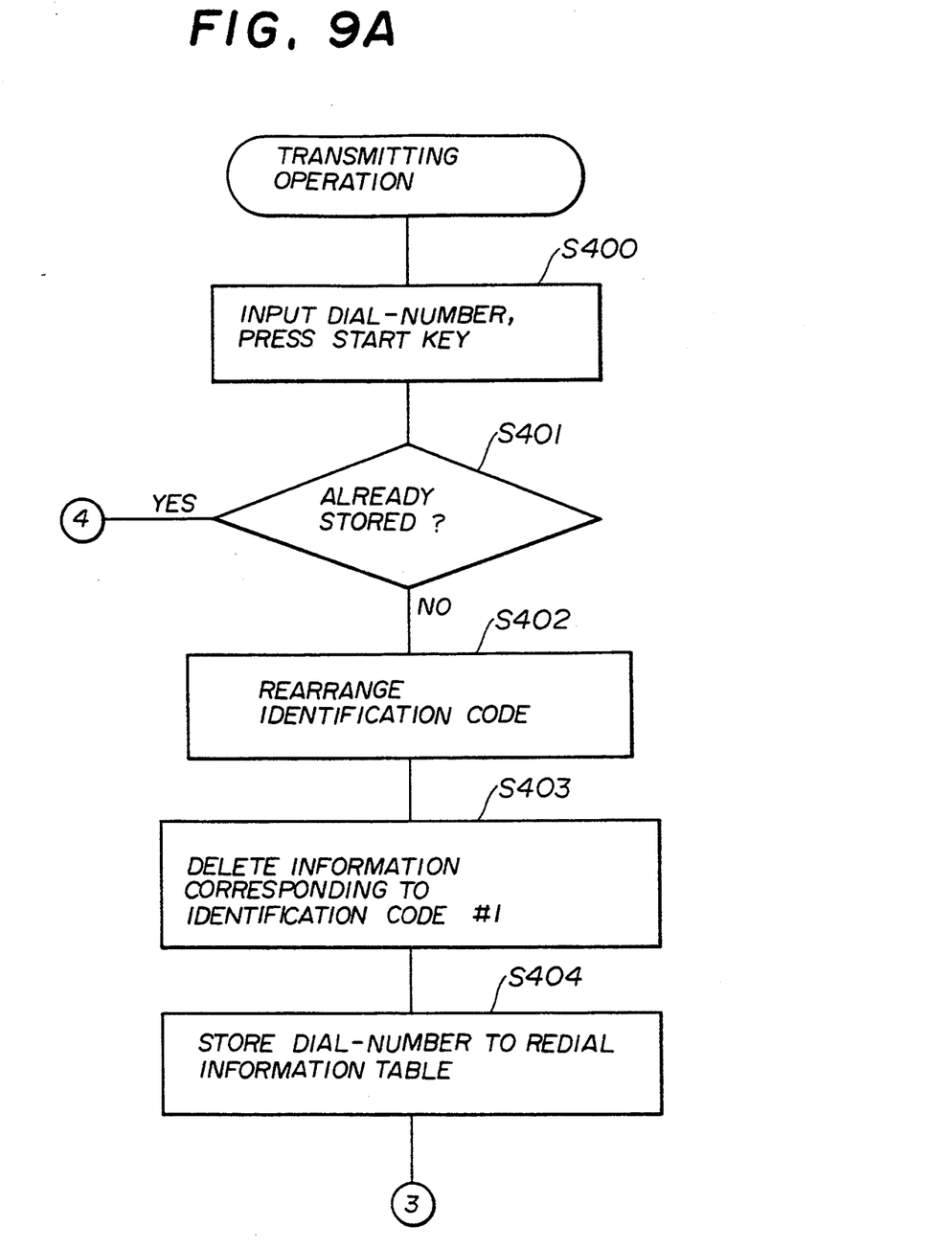
FIGS. 9A, 9B, and 9C are parts of a flow chart for explaining the transmitting operation in a condition where a transmission is made with the new dial-number.
Figure 9B:
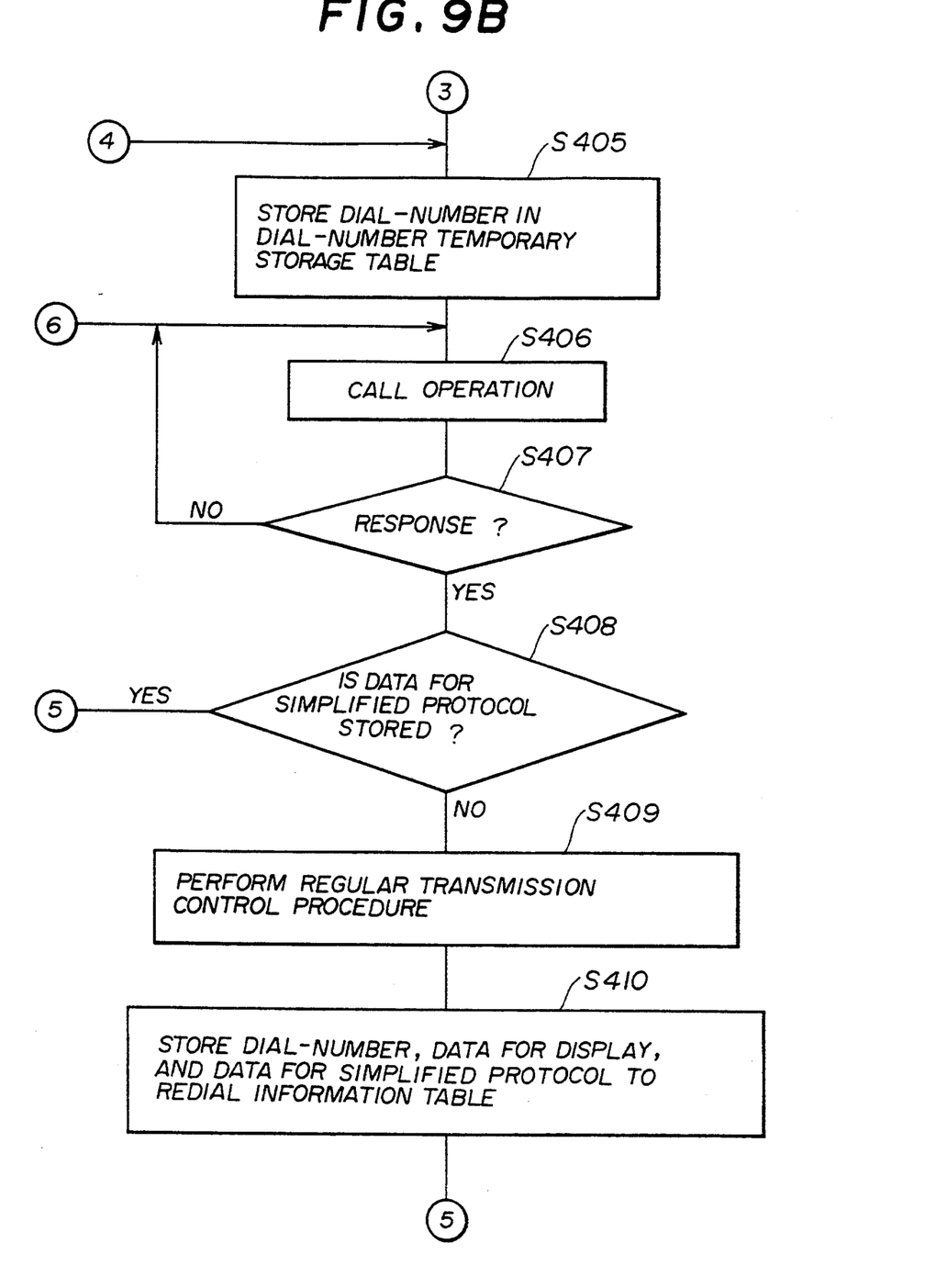
Figure 9C:
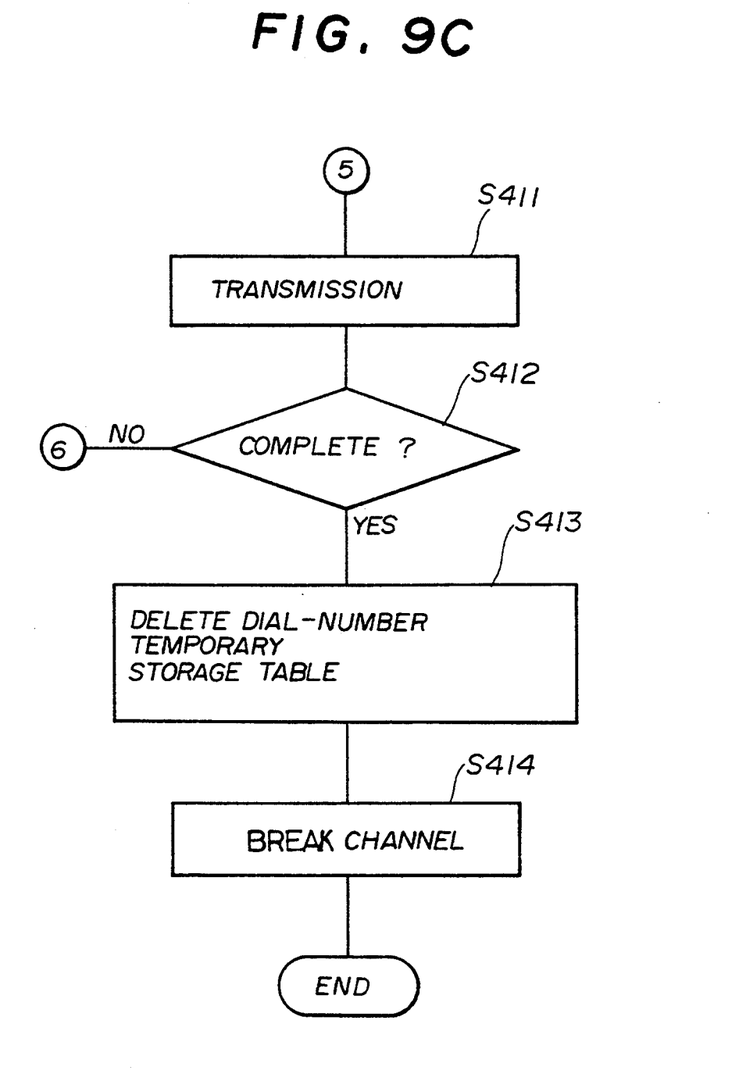

FIGS. 9A, 9B, and 9C are parts of a flow chart for explaining the transmitting operation in a condition where a transmission is made with a new dial-number. The operation of the facsimile apparatus starts, in S400, by entering the new dial-number by means of ten key 4a and pressing the start key 4c. Then the dial-numbers stored in the redial information table 3a are searched, in S401, so as to determine whether or not the entered new dial-number has been already stored in the redial information table 3a.

When it is determined that the entered new dial-number has not been stored in the redial information table 3a, the identification code positioned in the lowest priority position stored in the priority table 3b is moved, in S402, to the highest priority position. That is, in S402, each of the identification codes from #1 to #9 is moved to the next lower position so as to rearrange the priority table 3b.

On the assumption that the identification code located in the first position in the priority table 3b is #1, the dial-number, data for display, and data for simplified protocol corresponding to the identification code #1 stored in the redial information table 3a are deleted in S403.

Next, in S404, the entered new dial-number is stored in the position corresponding to the identification code #1 in the redial information table 3a, and then the identification code #1 and the entered new dial-number are stored, in S405, in the 10 dial-number temporarily storing table 3c.

Next, the routine proceeds to S406 where a calling operation using the dial-number stored in the dial-number temporarily storing table 3c is performed. In the next step S407, it is judged whether or not there is a response from the called terminal. When there is a response from the called terminal, the identification code stored in the dial-number temporarily storing table 3c is read and it is checked, in S408, whether or not data for the simplified protocol corresponding to the identification code #1 is stored in the redial information table 3a. When it is judged, in S407, that there is no response from the called terminal, the routine returns to S406 so as to perform a calling operation again.

Since the transmitting operation is performed with the new dial-number, it is judged, in S407, that there is no data for the simplified protocol stored in the redial information table 3a, and thus a regular transmission control procedure is performed in the next step S409. That is, for example, DIS (Digital Identification Signal), CSI (Called Subscriber Identification) and NSF (Non-Standard Facilities) are received from the called terminal and DCS (Digital Command Signal), TSI (Transmitting Subscriber Identification), and NSS (Non-Standard facilities Set-up) are sent to the called terminal, and a modem training procedure is executed so as to determine the transmission speed of image signals. The dial-number of the called terminal is obtained by the CSI, and the designation of the called terminal is obtained from the RTI information of the NSF data. Additionally, the capability information of the called terminal is obtained from the DIS and NSF information.

In S410, the dial-number and the designation of the called terminal are stored in the position corresponding to the identification code #1 in the redial information table 3a so as to be used as data for display. Additionally, the capability information and the transmission speed information are also stored in the redial information table 3a so as to be used as data for the simplified protocol.

In S411, the image signals, obtained from a document placed in the scanner 5 or stored in an image signal memory, are transmitted to the called terminal. In the next step S412, it is judged whether or not the transmission is complete. When it is judged, in S412, that the transmission has completed, the routine 10 proceeds to S413 where the dial-number and corresponding identification code is deleted from the dial-number temporarily storing table 3c. After executing S412, the connection to the called terminal is broken, in S413, and the routine ends.

If it is judged, in S412, that the transmission is not complete, as in a case where an error occurs, the routine returns to S406 after a predetermined period so as to perform the transmission again.

By the above mentioned transmitting operation, the new dial-number, designation of the called terminal, and data for the simplified protocol can be stored in the redial information table 3a every time a transmission is performed with a new dial-number. Accordingly, a redial operation for the new dial-number can be performed from the next time the new dial-number is dialed.

Additionally, since a plurality of dial-numbers are stored in the redial information table and that information can be transferred to the registration memory of the RAM 3 by means of the CPU 1, the operation of registration and editing of dial-numbers can be simplified. And a transmission performed by using the single-key function or the simplified-key function can be quickly performed due to the data for simplified protocol. Further, there is no possibility of registering a wrong dial-number by mistake because the registered dial-number has been dialed once before and confirmed by means of the past communication.

The present invention is not limited to the specifically disclosed embodiments, and variations and modifications may be made without departing from the scope of the present invention.

What is claimed is:

1. A communication apparatus performing communication with a remote terminal by establishing a communication channel by calling the dial-number of said remote terminal, which communication apparatus comprising:

a redialing means for dialing a previously dialed dial-number by operating a redial key, said dial-number having been stored in a redial memory;

a registered dial-number dialing means for dialing a registered dial-number by operating a predetermined key, said registered dial-number having been stored in a registration memory;

a registration means for registering a dial-number to be used by said registered dial-number dialing means by directly transferring said dial-number from said redial memory to said registration memory; and means for storing capability information including protocol data of said called terminal to said redial memory, said capability information being transferred to said registration memory by said registration means together with the corresponding dial-number so that a regular transmission protocol procedure is simplified by using said capability information stored in said registration memory when a transmission to a remote terminal is performed by said registered dial-number dialing means.

2. The communication apparatus as claimed in claim 1, further comprising means for comparing a new dial-number being registered with each of said dial-numbers already stored in said registration memory so that duplicate registration of the same dial-number is prevented by notifying the operator of said communication apparatus of the existence of the same dial-number in said registration memory.

3. A communication apparatus performing communication with a remote terminal by establishing a communication channel by calling the dial-number of said remote terminal, which communication apparatus comprising:

a redialing means for dialing a previously dialed dial-number by operating a redial key, said dial-number having been stored in a redial memory;

a registered dial-number dialing means for dialing a registered dial-number by operating a predetermined key, said registered dial-number having been stored in a registration memory;

a registration means for registering a dial-number to be used by said registered dial-number dialing means by directly transferring said dial-number from said redial memory to said registration memory; and means for storing identification information which identifies the called terminal, received from said called terminal in accordance with a transmission control procedure, to said redial memory, said identification information being transferred to said registration memory together with the corresponding dial-number, said identification information being used when an operation of calling a remote terminal is performed by said registered dial-number dialing means.

4. The communication apparatus as claimed in claim 3, further comprising means for storing capability information including protocol data of said called terminal to said redial memory, said capability information being transferred to said registration memory by said registration means together with the corresponding dial-number so that a regular transmission protocol procedure is simplified by using said capability information stored in said registration memory when a transmission to a remote terminal is performed by said registered dial-number dialing means.

5. The communication apparatus as claimed in claim 3, further comprising means for comparing a new dial-number being registered with each of said dial-numbers already stored in said registration memory so that duplicate registration of the same dial-number is prevented by notifying the operator of said communication apparatus of the existence of the same dial-number in said registration memory.

6. The communication apparatus as claimed in claim 3, wherein said redial memory stores a plurality of dial-numbers and identification information corresponding to each of said dial-numbers, said communication apparatus further comprising displaying means for displaying said identification information together with the corresponding dial-number so that the operator can recognize the desired dial-number by seeing said identification information displayed by said displaying means.

7. The communication apparatus as claimed in claim 4, wherein said redial memory stores a plurality of dial-numbers and said redial memory further stores identification information and capability information corresponding to each of said dial-numbers, said communication apparatus further comprising displaying means for displaying said identification information together with the corresponding dial-number so that the operator can recognize the desired dial-number by seeing said identification information displayed by said displaying means.

8. A communication apparatus, comprising:
means for calling a terminal;
first receiving means for receiving identification information from the terminal which has been called by the means for calling;
first means for storing the received identification information in a memory;
wherein said means for calling uses the stored identification information after the first means for storing the received identification information stores the received identification information;
said communication apparatus further comprising:
a redialing means for dialing a previously dialed number which has been stored in a redial memory;
a registered dial-number dialing means for dialing a registered dial-number which has been stored in a registration memory; and
a transfer means for transferring said dial-number from said redial memory to said registration memory and for transferring the identification information to said registration memory;
wherein said means for calling uses one of said redialing means and the and the registered dial-number dialing means when calling the terminal.

9. A communication apparatus according to claim 8, further comprising:
second receiving means for receiving a specification describing capabilities of said terminal including protocol data of said terminal;
second means for storing the received specification in the memory;
wherein said means for calling uses the stored specification after the second means for storing stores the received specification.

10. A communication apparatus, comprising:
means for calling a terminal;
first receiving means for receiving a specification describing capabilities of said terminal including protocol data of said terminal;
first means for storing the received specification in a memory;
wherein said means for calling uses the stored specification after the first means for storing the received specification stores the received identification information;
said communication apparatus further comprising:
a redialing means for dialing a previously dialed number which has been stored in a redial memory;
a registered dial-number dialing means for dialing a registered dial-number which has been stored in a registration memory; and
a transfer means for transferring said dial-number from said redial memory to said registration memory and for transferring the specification to said registration memory;
wherein said means for calling uses one of said redialing means and the and the registered dial-number dialing means when calling the terminal.

11. A communication apparatus according to claim 10, further comprising:
second receiving means for receiving identification information from the terminal which has been called by the means for calling;
second means for storing the received identification information in the memory;
wherein said means for calling uses the stored identification information after the second means for storing stores the received specification.

* * * * *